Aug. 29, 1961 S. S. ROMANO 2,998,177

TAPE GUIDE

Filed Oct. 7, 1959

INVENTOR:
SAM S. ROMANO

BY Watson D. Harbaugh

ATT'Y

United States Patent Office 2,998,177
Patented Aug. 29, 1961

2,998,177
TAPE GUIDE

Sam S. Romano, North Lake, Ill., assignor to Webcor, Inc., Chicago, Ill., a corporation of Illinois Filed Oct. 7, 1959, Ser. No. 845,002
5 Claims. (Cl. 226—189)

This invention relates to a tape guide for a magnetic tape recorder. A principal object of the invention is the provision in a device of this character of a tape guide and pressure arm assembly that will properly position a recording tape in relation to a head of an operating station.

Another object of the invention is to provide a device of this character with a tape guide and positioning means which is fashioned and formed in part from a suitable material such as nylon, polyethylene or the like to assure an efficient and silent movement of the tape through the recorder.

The principal purpose of the invention is to provide a means for positioning a tape in its movement in either direction correctly with respect to the head of an operating station so that the passage therethrough will be without frictional vibration and without direct contact with a metallic give past which would normally affect the recording properties of the device.

Yet another object of the invention is to provide a tape guide and pressure pad assembly movable simultaneously into effective position with respect to a movable tape passing in either direction over the recording head of an operating station wherein the guiding of the tape laterally is dependent upon the associated location of the effective non-metallic guide in a mating metallic member.

Other objects will appear hereinafter.

The invention contemplates the novel combination and arrangement of parts to be hereinafter described and claimed.

The invention will be best understood by reference to the accompanying drawings showing the preferred form of construction, and in which.

This invention relates to a tape guide and positioning means for use in either a one or two directional tape recorder and in which the tape may be provided with a plurality of sound tracks or record paths. The purpose of the guide is to correctly position the moving tape in a predetermined relationship and under a predetermined tension with respect to the head of an operating station. The guide functions to prevent traverse movement of the tape relative to its longitudinal length as it is moved in either direction over the sound head. Thus, the guide maintains the separate and distinct record paths as the tape is moved relative to the sound head.

In prior devices of this character, it has been the practice to merely pass the tape over a post disposed in its path as it is threaded through the recorder. By means of a capstan the tape is pulled over the head of the operating station. This pulling action along with the guide and pad supports has resulted in an audio frequency resulting from the vibration of the tape which was the result of the frictional passing of the tape over the post and through a tensioning pad arrangement under the pulling tension of the capstan. It is the object of this invention to provide a tape guide and positioning means which will remove these prior objections and more specifically a non-metallic guide element with a frictional felt pad spaced upstream therefrom supported in part on an arm or block whose movement towards and away from contact with the tape is controlled by a guide or pivot pin located further upstream of the tape movement and preferably in close proximity to the path of movement of the tape.

Figure 1:
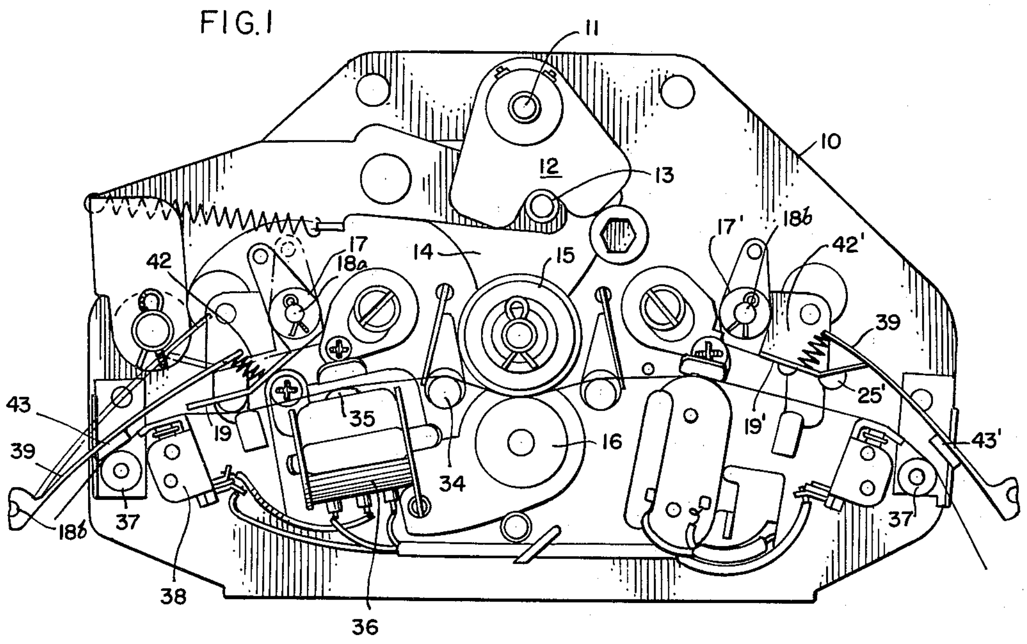
FIG. 1 is a plan view of a portion of the interior mechanism of a two-way recorder with such portion commonly referred to as a "tape transport mechanism;"

Referring to FIG. 1, there is shown that portion of a tape recorder which is known as the "tape transport mechanism." Such mechanism includes a frame 10. Pivotally mounted on the frame 10 upon a shaft 11 is a cam member 12. This cam member 12 will operate upon a cam follower 13 carried by a pressure roller arm assembly 14. This assembly 14, together with other related structures not shown or described herein, is instrumental in determining the direction of travel of the tape through the mechanism in a manner set forth in Patents 2,741,439 and 2,864,894.

By actuation of the pressure arm assembly 14, a pressure roller 15 will be moved into engagement with a capstan 16 so as to feed the tape T through the recorder.

To correctly position the tape T in its directional travel with respect to the sound head, there is provided a guide arm and pressure pad assembly 17 adjacent the side edges of the frame 10. As each of the assemblies comprises like parts, only one will be described, and like parts will be given the same primed reference numeral.

Figure 2:
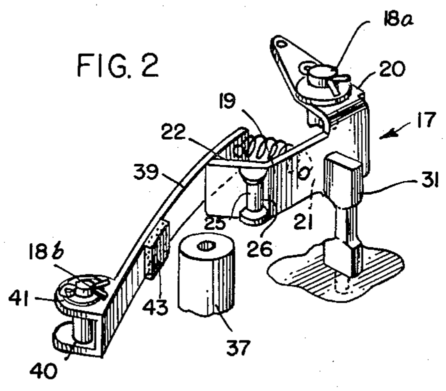
FIG. 2 is a fragmentary perspective view of the tape guide and pressure pad assembly.

The guide arm and pressure pad assembly 17 includes a pair of shafts or pivot pins **18*a* and 18*b* carried by and protruding laterally from the frame 10. A guide arm 19 is provided with laterally extending spaced apart ears 20 and 21 which are pivotally journalled on the shaft 18*a*. The end 22 of the arm 18 is deformed out of the longitudinal plane of the arm 19**, as viewed in FIGS. 1 and 2, for a purpose hereinafter made apparent.

Figure 3:
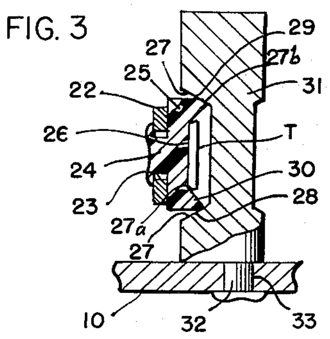
FIG. 3 is a fragmentary detail view showing the tape in guided relationship between the tape guide and post.

The end 22 of the arm 19 is provided with a vertically elongated aperture 23 through which loosely extends a correspondingly vertically elongated connecting portion 24 of a guide member 25. The connecting portion 24 is swaged over the edges of the aperture 23, as seen in FIG. 3, so as to loosely connect the guide member 25 to the end 22 of the arm 19 in a vertically oriented position.

The guide member 25 has its exposed face grooved as at 26. The edges 27 defining the groove 26 are parallel for a little over the thickness of the tape at **27*a* and then tapered outwardly and diagonally with respect to each other. These edges 27 are adapted to cooperate with oppositely extending tapered edges 28 and 29 for vertical orientation of the guide member with respect to the pick-up heads and the edges 28 and 29 formed by an eccentric lathe operation define a passage 30 in one side of a guide post 31**, to provide a closed guide path for the tape T.

The guide post 31 is adapted to be connected to the frame 10 by means of a depending lug 32 thereof which extends through a suitable aperture 33 formed in the frame 10. It should be noted that the guide post 31 lies in a longitudinal plane which extends between it and a guide roller 34, which is provided by the frame 10 on the opposite side of the head 35 of the operating station 36 and which plane is slightly beneath the crown of the head 35. Thus, when the guide member 25 is pivoted into guiding position with respect to the post 31, the tape T will be moved out of its normal path of travel over the sound head 35, and into a predetermined path of travel whereby it is correctly positioned with respect to such head 35, as viewed in FIG. 1 as guided by the parallel portions **27*a* of the groove 26**.

As the tape T is adapted to move off its carriage reel, it is adapted to be threaded over a pressure roller 37. This pressure roller 37 is rotatably carried by the frame 10 adjacent an erasing member 38.

To correctly tension the tape onto the erasing member 38 there is provided a pressure bar 39. This pressure bar 39 is pivotally supported on the pin 18b to engage and be controlled by the movement of the guide arm 19 in a manner and for a purpose hereinafter described.

The pressure bar 39 is provided with a pair of laterally extending spaced apart ears 40 and 41. These ears are adapted to be journalled upon the shaft 18b between suitable washers as viewed in FIG. 2.

A tension spring 42 has one end connected to the guide arm 19 and its opposite end connected to the pressure bar 39 so as to resiliently connect together such parts. On the pressure bar 39 there is provided a felt pad 43 which is adapted to be moved into confronting relation with the roller 37 for frictionally retarding movement of the tape T by contact between the pad 43 and the back side of the tape.

As it appears from FIG. 1, there is a guide arm and pressure pad assembly 17 on each side of the frame 10. Each of these assemblies 17 and 17' is connected together by suitable mechanical linkage (not shown) so that they may be alternately moved into operative position with respect to the tape T and its direction of travel. In FIG. 1, the tape T is shown as moving from the left to right, and the guide arm and pressure pad assembly 17 (positioned to the left side of the frame 10) is shown in operative relation with respect to the guide post 31 and pressure roller 37 respectively.

It can readily be seen that by construction of the guide member 25 and the post 31, the tape T will be at all times correctly positioned with respect to the associated operative parts of the recorder as the tape moves therethrough. The tapered edges 28 and 29 of the post 31 correctly position the guide member 25 in its movement into engagement with the post 31. The tapered edges 27 of the groove 26 formed in the guide member 25 assure the proper positioning of the tape T with respect to the guide member 25 as it moves into engagement with the post 31.

Moreover, as the guide member 25 is loosely connected to the guide arm 19, not only is the correct position of the tape assured but any vibrational frequencies that may be developed by the frictional tension of the tape as it moves through the mechanism, will be trapped and cushioned by the guide member 25, thus preventing such vibrational disturbances from being picked up by the sensitive sound head 35. Moreover, by locating the support pin 18b of the pad arm 39 upstream of the direction of tape movement vibration is eliminated which might cause squealing in the reproduction of sound with tapes and guides that have a high incidence of vibration.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

What is claimed is:

1. A tape guide and pressure arm assembly for a tape recorder having a tape transport mechanism through which a tape is adapted to be moved in either direction, a pair of spaced apart tape guide rollers on either side of a pick-up drum of said recorder and over which rollers a tape is normally placed when threaded in said mechanism, a tape guide arm pivotally connected to said frame adjacent the path of said tape and between said guide rollers, means for pivotally connecting said guide arm to said frame, a tape receiving means on said guide arm and adapted to engage said tape when said guide arm is pivoted in one direction about its pivotal connection, a guide post on said frame between said rollers and in the path of pivotal movement of said guide arm and cooperating with said tape receiving means for guiding and positioning said tape in a predetermined path with respect to the pick-up drum and said rollers, a pressure arm connected to said guide arm and pivotal therewith about said means for pivotally connecting said guide arm to said frame, means for connecting said pressure arm to said guide arm in spaced apart substantially parallel relation, said pressure arm engageable with said tape and one of said rollers for establishing a frictional drag on the tape remotely from said pick-up drum when said guide arm is pivoted in one direction about its pivotal connection.

2. A tape guide and pressure arm assembly for a tape recorder having a tape transport mechanism through which a tape is adapted to be moved in either direction, a pair of spaced apart tape guide rollers on either side of a pick-up drum of said recorder and over which rollers a tape is normally placed when threaded in said mechanism, a tape guide arm pivotally connected to said frame adjacent the path of said tape and between said guide rollers, means for pivotally connecting said guide arm to said frame, a tape receiving head on said guide arm and adapted to engage said tape when said guide arm is pivoted in one direction about its pivotal connection, a guide post on said frame between said rollers and in the path of pivotal movement of said guide arm, means provided by said post for cooperating with said tape receiving head for guiding and positioning said tape in a predetermined path with respect to the pick-up drum and said rollers, a pressure arm connected to said guide arm and pivotal therewith about said means for pivotally connecting said guide arm to said frame, means for connecting said pressure arm to said guide arm in spaced apart substantially parallel relation, said pressure arm engageable with said tape and one of said rollers for establishing a frictional drag on the tape remotely from said pick-up drum when said guide arm is pivoted in one direction about its pivotal connection.

3. A tape guide and pressure arm assembly for a tape recorder having a tape transport mechanism through which a tape is adapted to be moved in either direction, a pair of spaced apart tape guide rollers on either side of a pick-up drum of said recorder and over which rollers a tape is normally placed when threaded in said mechanism, a tape guide arm pivotally connected to said frame adjacent the path of said tape and between said guide rollers, means for pivotally connecting said guide arm to said frame, a tape receiving means on said guide arm and adapted to engage said tape when said guide arm is pivoted in one direction about its pivotal connection, said tape receiving means having a nylon insert head on the free end thereof with said head providing a groove for receiving therein the tape to be guided when said guide arm is pivoted in one direction, means provided by said head adjacent said groove for positioning said tape in said groove, a guide post on said frame between said rollers and in the path of pivotal movement of said guide arm and cooperating with said tape receiving means for guiding and positioning said tape in a predetermined path with respect to the pick-up drum and said rollers, a pressure arm connected to said guide arm and pivotal therewith about said means for pivotally connecting said guide arm to said frame, means for connecting said pressure arm to said guide arm in spaced apart substantially parallel relation, said pressure arm engageable with said tape and one of said rollers for establishing a frictional drag on the tape remotely from said pick-up drum when said guide arm is pivoted in one direction about its pivotal connection.

4. A tape guide and pressure arm assembly for a tape recorder having a tape transport mechanism through which a tape is adapted to be moved in either direction, a pair of spaced apart tape rollers on either side of a pick-up drum of said recorder and over which rollers a tape is normally placed when threaded in said mechanism, a tape guide arm pivotally connected to said frame adjacent the path of said tape and between said guide rollers, means for pivotally connecting said guide arm to said frame, a tape receiving means on said guide arm and adapted to engage said tape when said guide arm is pivoted in one direction about its pivotal connection, a guide post on said frame between said rollers and in the path of pivotal movement of said guide arm and cooperating with said tape receiving means for guiding and positioning said tape in a predetermined path with respect to the pick-up drum and said rollers, said guide post having formed in one vertical face thereof a groove for receiving said tape receiving means when said guide arm is pivoted into engagement with said guide post, means for guiding said tape receiving means into said groove, a pressure arm connected to said guide arm and pivotal therewith about said means for pivotally connecting said guide arm to said frame, means for connecting said pressure arm to said guide arm in spaced apart substantially parallel relation, said pressure arm engageable with said tape and one of said rollers for establishing a frictional drag on the tape remotely from said pick-up drum when said guide arm is pivoted in one direction about its pivotal connection.

5. A tape guide and pressure arm assembly for a tape recorder having a tape transport mechanism through which a tape is adapted to be moved in either direction, a pair of spaced apart tape guide rollers on either side of a pick-up drum of said recorder and over which rollers a tape is normally placed when threaded in said mechanism, a tape guide arm pivotally connected to said frame adjacent the path of said tape and between said guide rollers, means for pivotally connecting said guide arm to said frame, a tape receiving means on said guide arm and adapted to engage said tape when said guide arm is pivoted in one direction about its pivotal connection, said tape receiving means having a nylon insert head on the free end thereof with said head providing a groove for receiving therein the tape to be guided when said guide arm is pivoted in one direction, means provided by said head adjacent said groove for positioning said tape in said groove, a guide post on said frame between said rollers and in the path of pivotal movement of said guide arm and cooperating with said tape receiving means for guiding and positioning said tape in a predetermined path with respect to the pick-up drum and said rollers, said guide post having formed in one vertical face thereof a groove for receiving said head when said guide arm is pivoted into engagement with said guide post, means for guiding said head into said groove, a pressure arm connected to said guide arm and pivotal therewith about said means for pivotally connecting said guide arm to said frame, means for connecting said pressure arm to said guide arm in spaced apart substantially parallel relation, said pressure arm engageable with said tape and one of said rollers for establishing a frictional drag on the tape remotely from said pick-up drum when said guide arm is pivoted in one direction about its pivotal connection.

References Cited in the file of this patent

UNITED STATES PATENTS 2,864,609 Thrimble -------------- Dec. 16, 1958